United States Patent
Shelton

(10) Patent No.: US 6,488,576 B1
(45) Date of Patent: Dec. 3, 2002

(54) SHRIMP PROCESSING APPARATUS AND METHOD

(75) Inventor: R. Douglas Shelton, Stuart, FL (US)

(73) Assignee: Shelton Corporation, Enterprise, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/721,572

(22) Filed: Nov. 22, 2000

Related U.S. Application Data

(63) Continuation of application No. 09/339,758, filed on Jun. 24, 1999, now Pat. No. 6,200,209
(60) Provisional application No. 60/091,071, filed on Jun. 29, 1998.

(51) Int. Cl.[7] ............................................... A22C 29/02
(52) U.S. Cl. ...................................................... 452/3
(58) Field of Search ..................... 452/3, 5, 2

(56) References Cited

U.S. PATENT DOCUMENTS

| | | |
|---|---|---|
| 2,034,691 A | 3/1936 | Bottker et al. |
| 2,659,930 A | 11/1953 | Jagger |
| 2,665,449 A | 1/1954 | Schneider et al. |
| 2,702,921 A | 3/1955 | Pinney |
| RE24,115 E | 1/1956 | Miller |
| 2,760,225 A | 8/1956 | Miller |
| 2,971,215 A | 2/1961 | Sloan |
| 3,040,374 A | 6/1962 | Miller |
| 3,345,682 A | 10/1967 | Lapeyre |
| 3,703,746 A | 11/1972 | Jones, Jr. |
| 3,787,928 A | 1/1974 | Domecki |
| 4,138,769 A | 2/1979 | Andersen |
| 4,210,982 A | 7/1980 | Hoffman et al. |
| 4,281,436 A | 8/1981 | Hoffman et al. |
| 4,393,543 A | 7/1983 | Martin |
| 4,745,660 A | 5/1988 | Betts et al. |
| 5,290,199 A | 3/1994 | Morris |
| 5,569,065 A | 10/1996 | Sawyer et al. |
| 5,613,903 A | 3/1997 | Harris et al. |

*Primary Examiner*—Peter M. Poon
*Assistant Examiner*—Floris C Coppier
(74) *Attorney, Agent, or Firm*—Allen, Dyer, Doppelt, Milbrath & Gilchrist, P.A.

(57) ABSTRACT

A shrimp processor removes the undesirable sand vein from a desirable shrimp meat portion and peels away a selectively cut shell. The shrimp processor includes a series of aligned conveyor roller pairs carried within its housing a spaced relation for conveying a headless shrimp from an entrance end of the housing to a downstream exit end. A high speed rotating saw tooth styled cutting blade having a knife edge is carried by the housing and positioned downstream the entrance end between adjacent conveyor roller pairs for cutting a 1/16" wide strip into the dorsal side of the shrimp along the longitudinal axis for exposing the sand vein. In combination with the dorsal strip cut, a second cutting blade cuts through the ventral side of the shrimp for severing the shell into opposing shell sections. A brush positioned further downstream sweeps the sand vein from the cut shrimp. Opposing peeler rollers then receive the shrimp and teeth extending from each roller penetrate the severed shell sections while the cut shrimp is being conveyed downstream, and peel the shell sections from a desirable meat portion of the shrimp while ejecting the deveined and peeled shrimp from the housing.

25 Claims, 6 Drawing Sheets

SHRIMP PROCESSING APPARATUS AND METHOD

CROSS REFERENCE TO RELATED APPLICATION

This application incorporates by reference and is a continuation of application Ser. No. 09/339,758, filed Jun. 24, 1999, which itself incorporates by reference and now U.S. Pat. No. 6,200,209 claims priority to Provisional application Ser. No. 60/091,071 for "Shrimp Deveining Apparatus" having a filing date of Jun. 29, 1998, all of which are commonly owned with the instant invention.

FIELD OF THE INVENTION

The present invention relates generally to mechanically processing shrimp, and more particularly to the automated removal of the vein and shell from a headless shrimp.

BACKGROUND OF THE INVENTION

A variety of problems associated with peeling the shell from a shrimp and removing the sand vein (deveining) continues to plague the industry with long felt needs to efficiently and not only economically provide the shrimp meat, but provide the meat with a desirable appearance. During the cutting of the shell prior to removal, the cutting blades often tear into the meat making many processed shrimp undesirable for presentation to customers in salads, by way of example, and useful only for a lower priced chopped meat used as a filling. There is a need for cutting the shell without damage to the meat, while still being able to effectively remove the shell and vein from the shrimp. By way of example, U.S. Pat. No. 3,345,682 to Lapeyre discloses the need for providing a clean-cut operation which preserves the integrity of the shrimp meat by individually cradling and securing one shrimp for cutting through a dorsal side of the shrimp and ripping out the vein.

For large quantities, restaurants and retail stores have typically relied upon commercial processors for providing the peeled and deveined shrimp. Processors will typically rely on large machines such as those described in U.S. Pat. Nos. Re. 24,115; 2,760,224; and 3,040,374 to Miller, by way of example. And while it is known to saw through the shell of the shrimp, as described by way of example, with reference to U.S. Pat. Nos. 3,787,928 to Domecki which discloses a shrimp splitting and cleaning machine in which the shrimp are mounted on a rotating transport wheel which feeds through a splitting and cleaning process, and U.S. Pat. No. 4,393,543 to Martin which uses a conveyor belt for transporting pre-oriented shrimp for uncurling, cutting, and washing for removing the vein from the shrimp body. The integrity of the meat would be better served, no pun intended, with a gentle handling of the shrimp being processed to meet the still present need for effectively cutting the shell and removing the sand vein while maintaining a high efficiency in the process.

Further, in the interest of freshness and cost, there is a need for a machine that can be effectively used by a grocer, a chef, and a seafood retailer, by way of example, without having the need for the high volume processing and experience of a commercial processor. There is a further need to be able to automatically process the shrimp in a timely manner, without undesirable handling, and with the result of a desirable production for the effort and time spent. The cleaning and preparation of a fresh shrimp should not have unfavorably impact on the available space, available water supply, and other normally required business operations.

SUMMARY OF INVENTION

In view of the foregoing background, it is therefore an object of the present invention to provide a shrimp deveining and peeling machine that is easily handled and economical for use in retail establishments, such as grocery stores, seafood markets, restaurants, in addition to being practical for use in commercial shrimp processing plants.

These and other objects, features, and advantages of the invention, are provided by a shrimp processing apparatus useful in removing the sand vein from a desirable shrimp meat portion and peeling the shell therefrom. The apparatus comprises a housing with a plurality of radially opposing conveyor roller pairs carried by the housing in a spaced relation and rotatably driven for conveying a headless shrimp from an upstream pair of conveyor roller pairs receiving the shrimp at an entrance end of the housing to a downstream roller pair for ejecting a processed shrimp therefrom. Each roller of the downstream roller pair includes a plurality of teeth elements radially extending therefrom for penetrating side wall shell sections of a cut shrimp and peeling the side wall sections from a desirable meat portion of the shrimp. A dorsal cutting blade is carried by the housing and is positioned for cutting a strip into a shrimp dorsal side along the longitudinal axis and exposing a sand vein in a cut shrimp. A brush, carried by the housing and positioned downstream the cutting blade, is used to sweep the sand vein from the cut shrimp as the cut shrimp is conveyed therepast through the conveyor roller pairs. In an alternate embodiment, a ventral cutting blade is also carried by the housing and is positioned downstream the entrance end for cutting through a shrimp ventral side along the longitudinal axis thereof.

A method aspect of the invention includes the steps of removing the sand vein from a desirable shrimp meat portion and peeling the shell therefrom. The method comprises the steps of receiving a shrimp at an entrance end of a plurality of rotatably driven conveyor roller pairs aligned in a spaced relation for conveying the shrimp therethrough, conveying the shrimp downstream the entrance end, cutting an elongate strip within a dorsal side of the shrimp for exposing a sand vein within a cut shrimp, sweeping the sand vein from the cut shrimp, peeling the shell away from a desirable meat portion of the cut shrimp, and ejecting the deveined and peeled shrimp from the housing. Alternatively, the method will further include the step of cutting the shrimp through a ventral side thereof along the longitudinal axis thereof.

BRIEF DESCRIPTION OF THE DRAWINGS

A preferred embodiment of the invention, as well as alternate embodiments are described by way of example with reference to the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
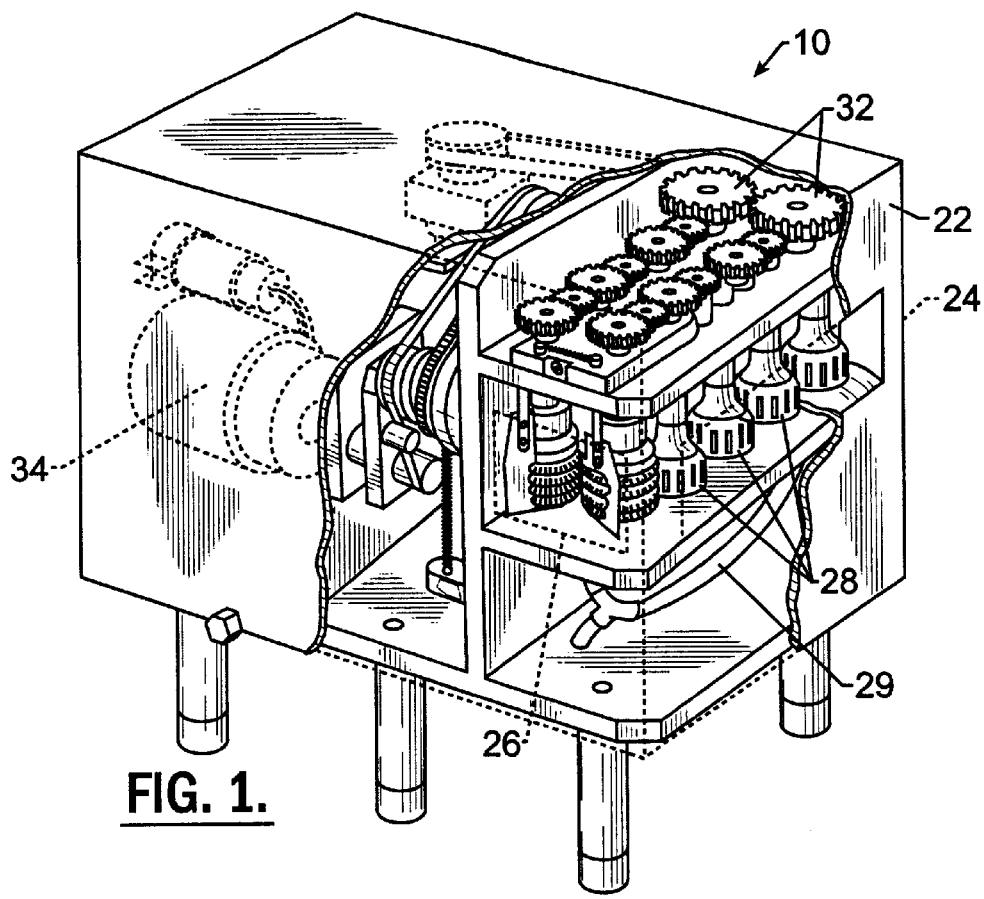
FIG. 1 is a perspective view of a shrimp peeling and deveining apparatus in accordance with the present invention.
Figure 2:
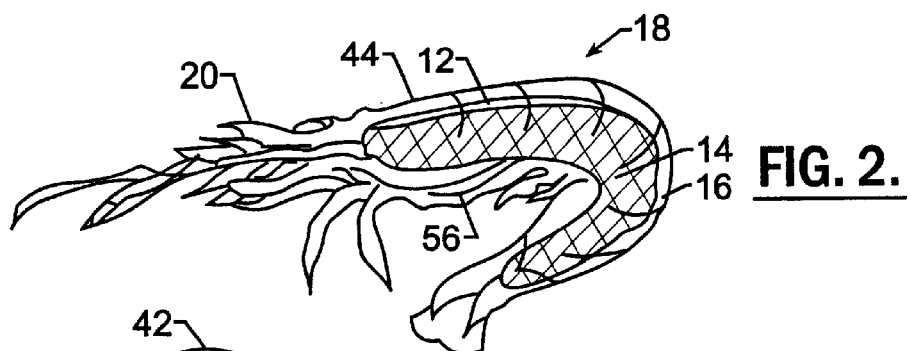
FIG. 2 is a partial cross-section view of a shrimp illustrating a desirable meat portion of the shrimp.
Figure 3:
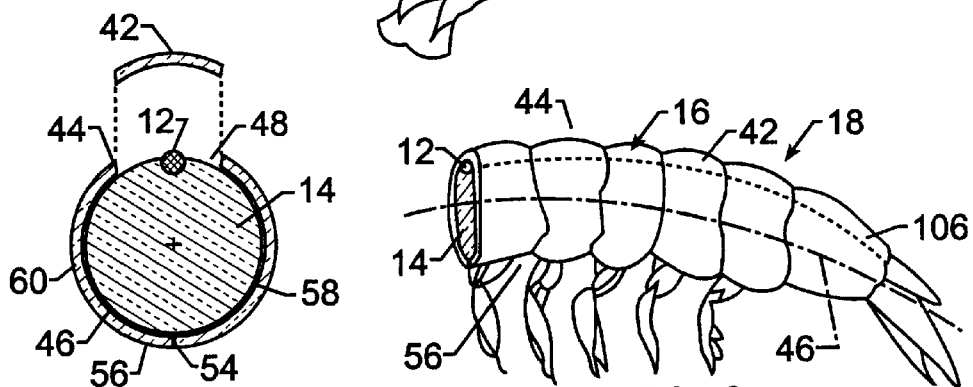
FIG. 3 is a perspective view of a headless shrimp.

With reference initially to FIGS. 1–3. one preferred embodiment of the present invention includes a shrimp processing apparatus 10 useful in removing the sand vein 12 from a desirable shrimp meat portion 14 and peeling the shell 16 from the shrimp 18 after removal of the head 20. The apparatus 10, herein described by way of example, comprises a housing 22 which, in a preferred embodiment receives the headless shrimp 20 at an entrance end 24, removes the sand vein, partially or fully peels away the shell as desired, and ejects it from the exit end 26. For the embodiment herein described, by way of example, the housing 22 comprises approximate outside dimensions of 15" length, 10" width, and 10" height, and weights approximately 25 pounds, which makes it particularly attractive for use in retail stores and restaurants. Further, typically available tap water is used to flush out the housing during and after the processing of the shrimp.

Figure 6:
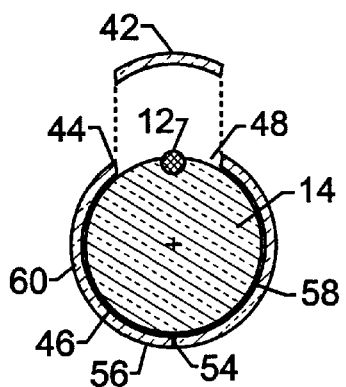
FIG. 6 is a partial transverse cross-section view of the headless shrimp of FIG. 3, illustrating a cut-away dorsal strip portion.
Figure 4:
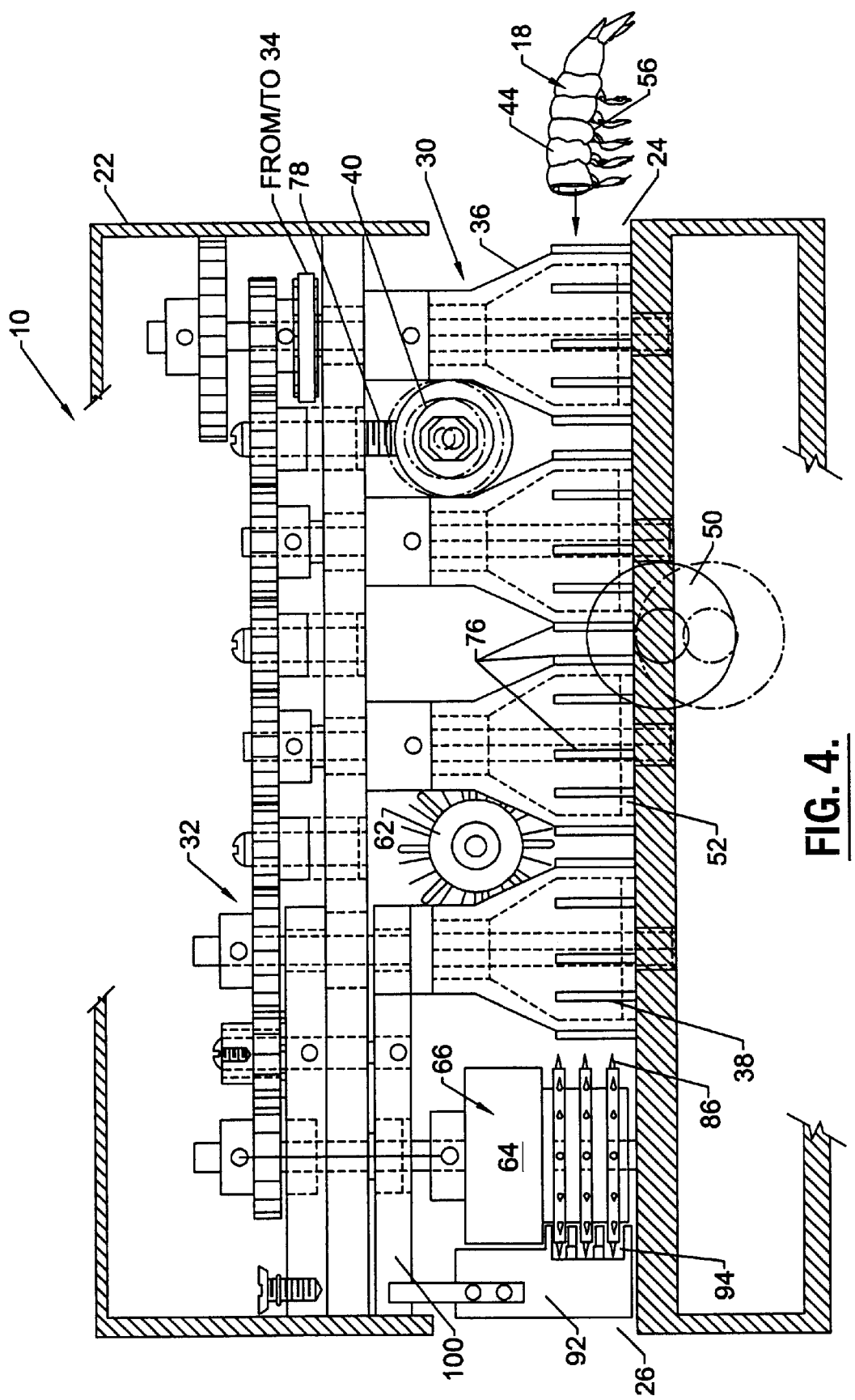
FIG. 4 is a partial side elevation view of elements of FIG. 1 illustrating one embodiment of a shrimp conveying and processing queue of FIG. 1.
Figure 5:
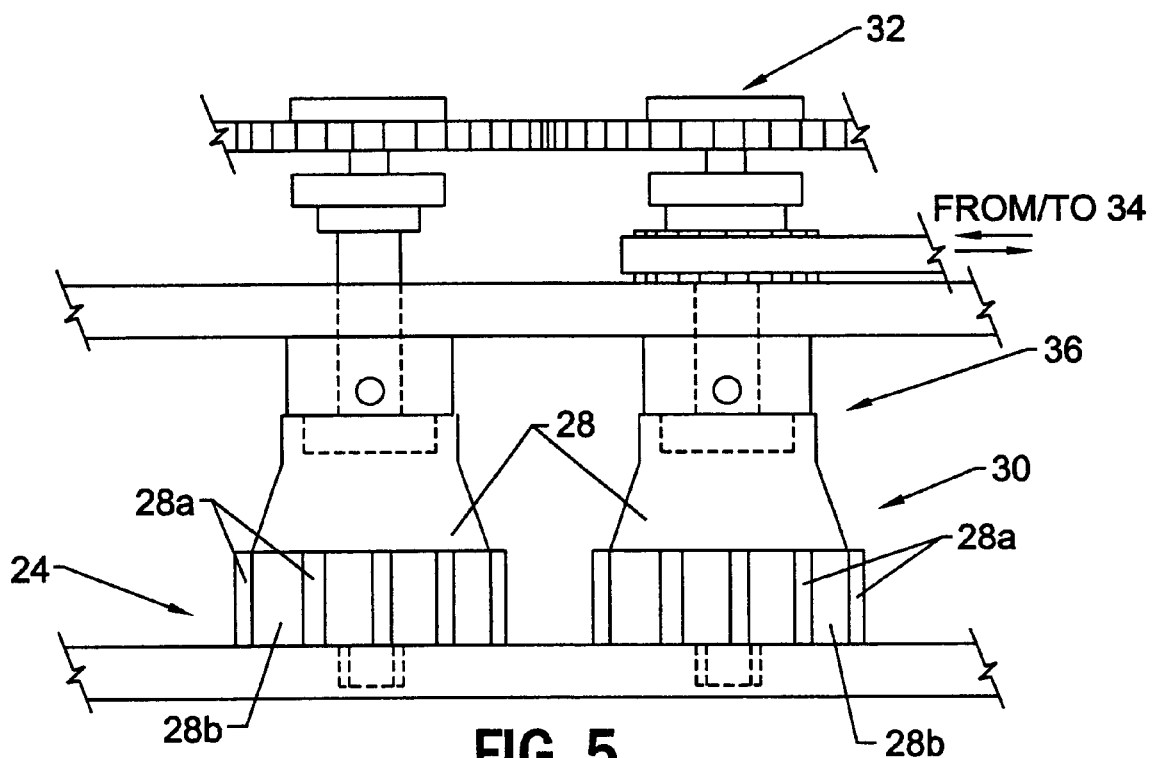
FIG. 5 is an end view of a conveyor roller pair carried at an entrance end of a housing of FIG. 1.

As illustrated with reference to FIGS. 4 and 5, eight flexible conveyor rollers 28 are arranged as a plurality of radially opposing conveyor roller pairs 30, and are carried within the housing 22 in a spaced relation and rotatably driven using cooperating gears 32 driven by a motor 34 carried within the housing. The motor in a preferred embodiment of the invention includes a ⅛ house power electric motor using 110 volt service, and a centrifugal clutch, rather than a typically heavier ¼ hp motor. The conveyor roller pairs 30 make direct contact with the shrimp 18 and convey the shrimp from an upstream pair 36 of conveyor rollers 28 which receive the shrimp at the entrance end 24 of the housing 22 to a downstream pair 38. A dorsal cutting blade 40 is carried by the housing 22 and positioned downstream the entrance end 24 between the adjacent conveyor roller pair 36. The dorsal cutting blade 40, in one preferred embodiment, cuts a ¹⁄₁₆" wide strip 42 into the shrimp dorsal side 44 along the longitudinal axis 46 of the shrimp 18 being conveyed past the dorsal cutting blade for providing an access opening 48 to a sand vein 12, as illustrated with reference to FIG. 6.

In an alternate embodiment, and as illustrated with reference again to FIG. 4, a ventral cutting blade 50, is also carried by the housing 22 and is positioned downstream the entrance end 24 between adjacent conveyor roller pairs 30, midstream roller pairs 52, as herein described by way of example, for making a cut 54 through a shrimp ventral side 56 along the longitudinal axis 46 of the shrimp 18 being conveyed therepast. The dorsal and ventral cutting blades 40, 50, in combination, cut through the shell 16 of the shrimp 18 to be severed and provide opposing left and right shell sections 58, 60.

As illustrated with reference again to FIG. 4, a brush 62 is carried by the housing 22 and is positioned downstream the dorsal cutting blade 40, between adjacent conveyor roller pairs 30. In the preferred embodiment, herein described, the brush 40 comprises a rotating cylindrical brush which sweeps into the access opening 48 in the shrimp dorsal side 44 and sweeps the sand vein 12 therefrom as the shrimp 18 is conveyed past the rotating brush 62 through the conveyor roller pairs 30. At this stage of processing, the headless shrimp 18 is deveined and has its shell severed along the dorsal side 44, and optionally as desired, severed along its ventral side 56, as above described by way of example. The left and right shell sections 58, 60 still adhere to the desirable, now deveined, meat portion 14, as the shrimp 18 is further conveyed toward the exit end 26 of the housing 22 and into peeler rollers 64 arranged as an opposing peeler roller pair 66. As illustrated with reference again to FIG. 1, a water line 29 is provided for directing water to various selected areas of the housing 22 between the entrance and exit ends 24, 26 for flushing out processing portions of the housing.

Figure 7:
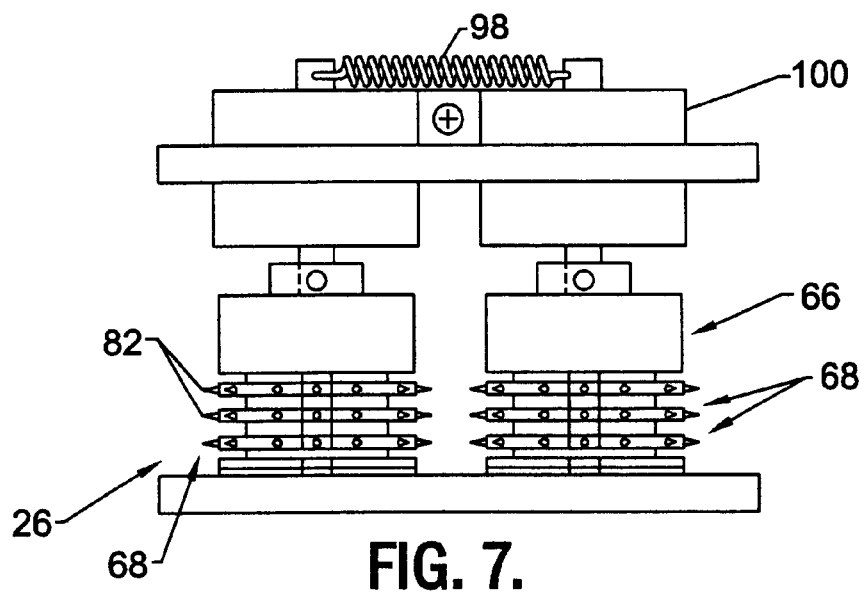
FIG. 7 is an end view of a peeler roller pair carried at an exit end of the housing of FIG. 1.

As illustrated with reference to FIG. 7, and again to FIG. 4, the opposing peeler roller pair 66, carried by the housing 22, is rotatably driven by the drive gears 32 and motor 34, earlier described, and are in a spaced relation for receiving the shrimp 18 therebetween. The peeler roller pair 66 is positioned downstream the conveyor roller pairs 30 for receiving the deveined and cut shrimp 18 therefrom. In a preferred embodiment, each peeler roller 64 includes a plurality of teeth elements 68 radially extending from a cylindrical shaped roller body 70 sufficiently pointed for penetrating the shrimp shell 16. As the shrimp 18 is conveyed downstream after having been cut and deveined, the peeler roller pair 66 receive the shrimp and penetrate the left and right shell sections 56, 60 to cause the sections to be pulled away from the desirable meat portion 14 under the action of the counter rotation rollers 64 for peeling the shrimp and ultimately ejecting the deveined and peeled shrimp out the exit end 26 of the housing 22. As earlier described, the motor 34 and associated drive gears 32 provide drive, means that are conveniently carried by the housing 22, and are operable for rotating the roller pairs 30, 66 and blades 40,50.

Figure 8:
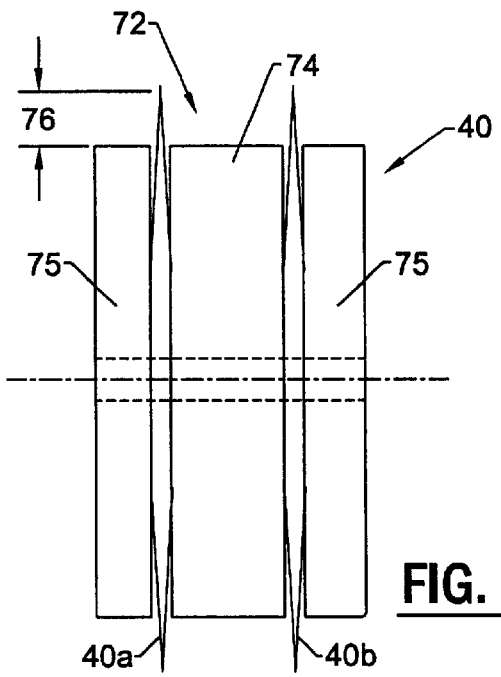
FIG. 8 is a partial front view of a dual bladed cutting saw of the present invention.

The dorsal blade 40 may cut the strip 42 into multiple fragments or as preferred, make a clean ¹⁄₁₆" strip using a dual blade arrangement for providing the strip 42 described with reference again to FIG. 6. Such a cut is achieved using the dual blade assembly 72 as illustrated, by way of example, with reference to FIG. 8. The dorsal cutting blade 40 comprises a coaxially spaced pair of cutting blades 40a, 40b separated by a spacer 74 having a lesser diameter (¼" preferred) than the blades for limiting a depth of cut 76 for the dual blade assembly 72, and a thickness of approximately ¹⁄₁₆". A pair of hubs 75 mounted on the outside of each blade 40a, 40b are effective in securing the blade 40 during rotation. The hubs 75 provide a ⅛" depth of cut 76 which has been shown to be effective and avoids damage to the meat, while a ¹⁄₁₆" strip 42 provides an effective access for sweeping out the sand vein, as earlier described. The dorsal cutting blade 40 is movably attached to the housing 22 by a lever arm 78 hinged to the housing and the axle of the dorsal blade for biasing toward the shrimp 18 and moveable along the outside contour of the shrimp during cutting thereof. Preferably, both the rotating cutting blades 40, 50 each comprise a saw tooth blade, sharpened to a knife styled edge for providing minimal damage to the meat portion 14 contacted by the blades. By providing saw tooth edged blades 40, 50, minimal pressure onto the shrimp is required for effectively cutting the shell 16 without undesirable damage to the meat 14. The dorsal cutting blade 40 is adjustable for distance and bias toward to shrimp using a tensioned spring. This becomes useful with large shrimp size differences. In the embodiment herein described, the rotating ventral cutting blade 50 does not "float" as does the dorsal blade. The vertical position of the ventral blade 50 is adjustable, but is held at a preset and fixed axis location, as desired by the user. The rotating brush 62 is 1.5" in diameter and comprises nylon bristles. In a preferred embodiment, the brush 62 is rotated at approximately 3000 rpm. The brush is adjustable toward and away from the shrimp and includes a preselected spring tension for biasing the rotating brush against the cut shrimp without damaging the meat.

As illustrated with reference again to FIGS. 4 and 5, a preferred embodiment of the flexible conveyor rollers 28 comprises rollers formed as hollow molded rubber rollers having side walls sufficiently flexible for embracing the shrimp about its body between the conveyor roller pairs 30 and conveying the shrimp downstream from conveyor roller pair to an adjacent conveyor roller pair and finally into the peeling roller pair 66, as earlier described. Each of the conveyor rollers herein described have a wall thickness of approximately ⅛" and are made of a A-40 durometer rubber. Such rollers have proven to be flexible enough to accommodate shrimp ranging in size from 100 count to 10 count per pound. To frictionally assist in holding and advancing the shrimp downstream through the rotating conveyor roller pairs 30, a preferred embodiment of the conveyor rollers 28 includes a plurality of ribs 28a radially extending therefrom, spaced from each other about the roller peripheral surface 28b and aligned generally parallel to each other and to the axis of the roller.

Figure 9:
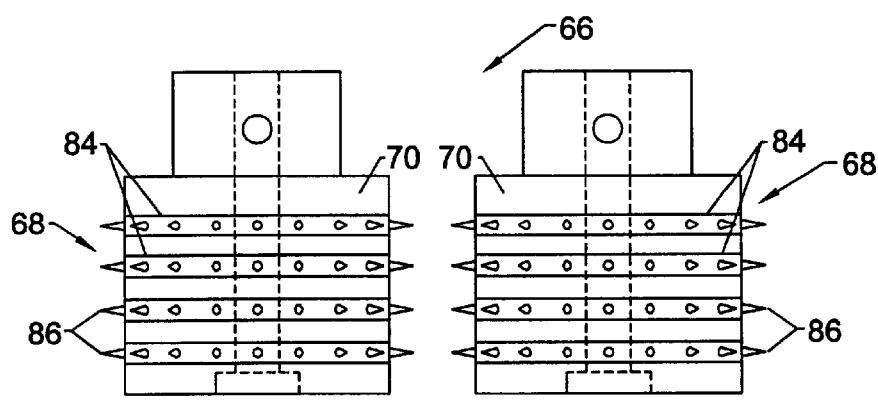
FIGS. 9 and 10 are side and top views of an alternate peeler roller pair.
Figure 10:
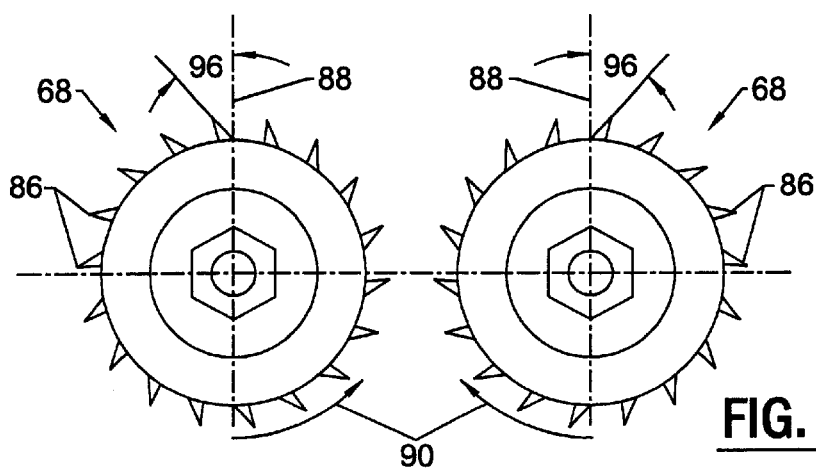

As illustrated with reference again to FIGS. 4 and 7, one embodiment of the peeler rollers 64 includes a plurality of axially spaced raised peripheral portions 80, with each raised peripheral portion having the teeth elements 68 formed as pins 82 radially extending therefrom. In an alternate embodiment, as illustrated with reference to FIGS. 9 and 10, the peeler rollers 64 comprise a plurality of circular saw styled discs 84 in an axially spaced arrangement, separated by a gap formed by the alternate stacking of a spacer 86 of lesser diameter that the discs 84. The pins 82 and the teeth 86 radially extending from each roller of the peeler roller pair 66 in a forwardly angled orientation away from a radial line 88 extending from the axis of the peeler through the base of each tooth and pin. The teeth elements 68 are angled toward a direction of rotation 90 of the roller 64, mirror images for opposing each peeler roller in the peeler roller pair 66. In an alternate embodiment, and as illustrated with reference again to FIG. 4, a stripper plate 92 is operable with the peeler roller pair 66 for stripping debris remaining on the peeler rollers 64 after stripping the shell from the shrimp. The stripper plate 92 includes a plurality of comb styled openings 94 for receiving the plurality of teeth elements 68 through the openings and close to the peeler roller body 70 to remove the debris from the peeler rollers 64 during their rotation. In one preferred embodiment, the peeler rollers 64 are made from a hard plastic having a diameter of approximately 1.5". As illustrated with reference again to FIGS. 7 and 9, is preferred to multiple discs 80, 84 with teeth elements 68 that protrude from the body 70 by approximately 3/32" on a 5 degree forward angle 96. A stainless steel spring 98 extends between the opposing peeler rollers 64 for biasing the rollers against the shrimp. In a preferred embodiment herein described and illustrated with reference again to FIG. 4, each peeler roller 64 is mounted on a lever arm 100 hinged to the adjacent and most downstream conveyor roller pair 38. The spring 98 is connected between the lever arms 100. As a result, the peeler rollers 64 will separate and contract as demanded by the size of the shrimp being conveyed between them. The movement of the peeler roller pair 66 on the lever arm 100 allows for a smooth transition from the conveyor roller pairs 30 to the peeler roller pair 66. Thus, and as further illustrated by way of example with reference to FIG. 11 a desired processing of the shrimp 18 entering the housing 22 has its vein removed and its shell 16 severed and removed from the desirable meat portion 14.

Figure 11:
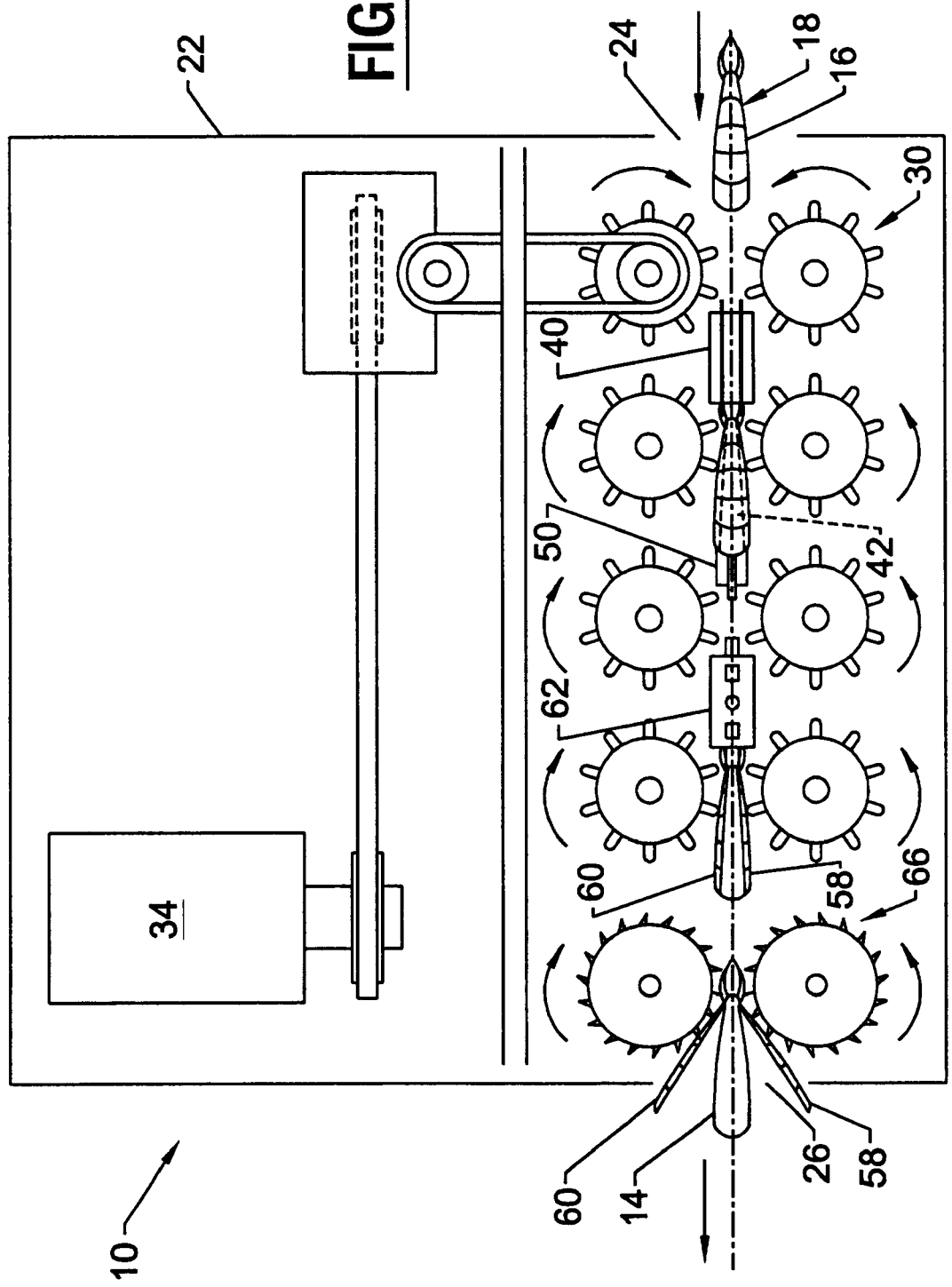
FIG. 11 is a top view of an opened housing of FIG. 1 illustrating a processing of a shrimp being conveyed through the apparatus to its ejection as a processed shrimp.
Figure 12:
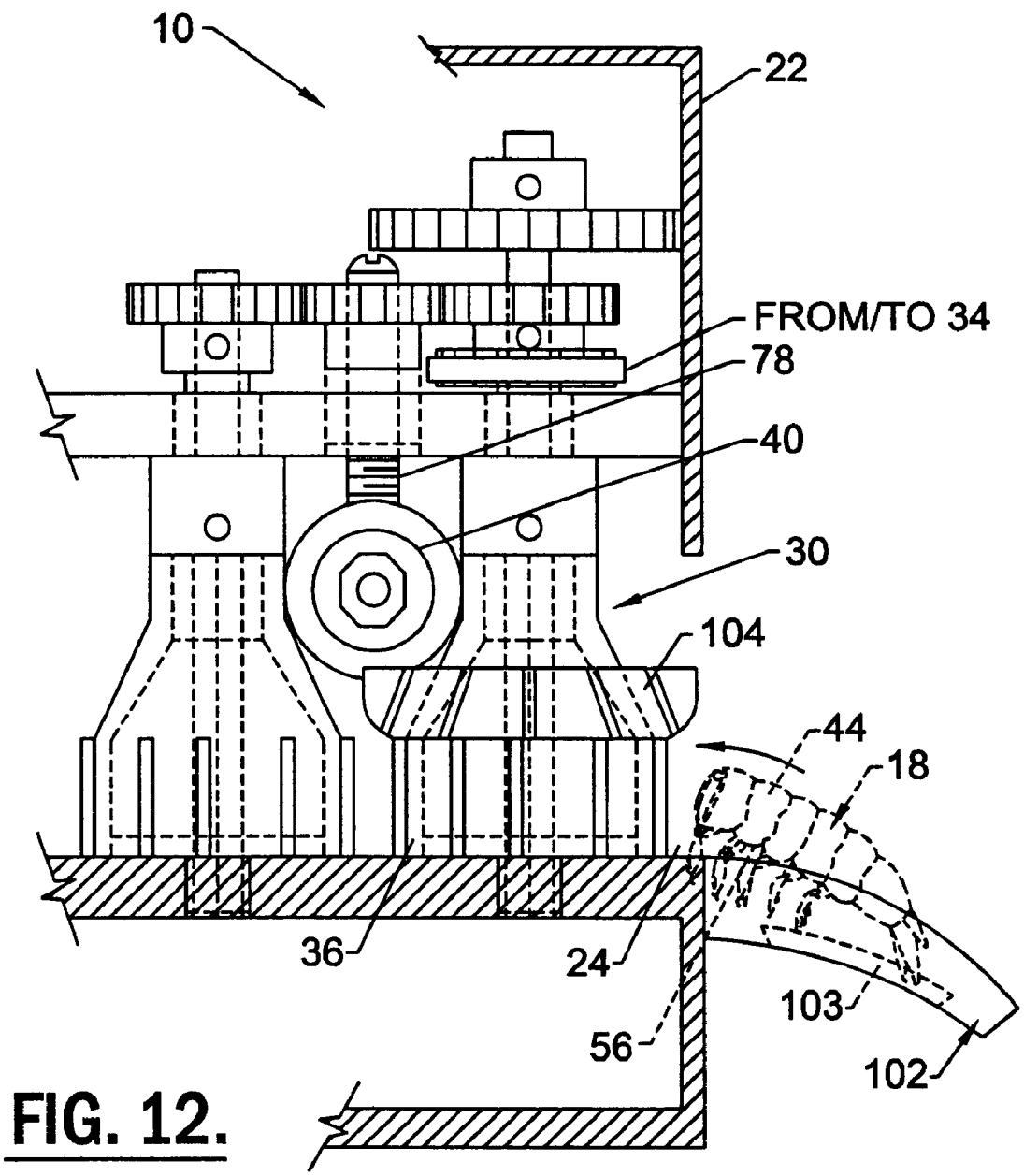
FIG. 12 is a partial side view of an alternate embodiment of FIG. 4.

In yet another embodiment as illustrated with reference to FIG. 11, the apparatus 10 includes an arcuate entrance ramp 102 adjustably hinged at the housing entrance end 24 for guiding the shrimp 18 into a desirable orientation prior to cutting by the dorsal cutting blade 40. The upstream conveyor roller pair 36 comprises a shoulder 104 for assisting in guiding the shrimp 18 in combination with the entrance ramp 102. With some shrimp entering the housing 22 in a curled shape and some entering in a straight shape, the rear shell section, illustrated with reference again to FIG. 3, may not be cut when desired. A contour within the entrance ramp 102 corrects for such variations. The ramp 102 will include a longitudinally extending groove 103 having width and depth dimensions ranging from approximately ⅜" to approximately ½" depending on the size of shrimp. With such, the narrower tail of the shrimp will ride within the groove, while the wider forward body will ride above it. This will allow the dorsal cutting blade 40 to be set for cutting as much of the shrimp shell as desired, sometimes purposely not cutting the rearmost shell section 106 when a "tail-on" shrimp is desired, and cutting the rearmost shell section when a "tail-off" shrimp is desired. These tail-off and tail-on options are also available without the use of the ramp by adjusting the height of the dorsal blade 40. Generally, the processed shrimp will be ejected from the housing with the shell attached only at the tail for easy manual removal of the shell from the shrimp for cooking and serving the desirable deveined and peeled shrimp. Further, the peeling rollers 64 can be removed for yet another embodiment where peeling of the shrimp 18 is not desired.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:
1. A shrimp processing apparatus comprising:
    a first roller pair rotatably driven for contacting a shrimp between peripheral surfaces thereof and conveying the shrimp downstream therefrom;
    a first cutting blade having a spaced pair of cutters positioned for cutting a strip into a shrimp dorsal side being conveyed therepast for providing access to a sand vein a second cutting blade positioned for cutting through a ventral side of the shrimp being conveyed therepast, wherein the first and second cutting blades are operable for severing the shell of the shrimp into opposing left and right shell sections;

sweeping means positioned downstream the first cutting blade for sweeping the sand vein from the shrimp as the shrimp is conveyed therepast; and a second roller pair operable with the first roller pair for receiving the shrimp therefrom between peripheral surfaces thereof and conveying same further downstream.

2. The apparatus according to claim 1, wherein the spaced pair of cutters of the first cutting blade comprises a spaced pair of cutting discs.

3. The apparatus according to claim 2, wherein the spaced pair of cutting discs include a spacer element therebetween for limiting a depth of cut into the shrimp.

4. The apparatus according to claim 1, wherein the first cutting blade is movably biased toward the shrimp for moving along a contour of the shrimp during the cutting thereof.

5. The apparatus according to claim 1, wherein the sweeping means comprise a rotatably driven brush.

6. The apparatus according to claim 1, wherein each of the first and second roller pairs comprises flexible, first and second hollow molded rollers.

7. The apparatus according to claim 6, wherein each of the first and second rollers comprises a plurality of ribs radially extending from the peripheral surface thereof.

8. The apparatus according to claim 7, wherein the plurality of ribs include a plurality of ribs aligned generally parallel to an axis of rotation of the roller.

9. The apparatus according top claim 1, further comprising a ramp positioned for guiding the shrimp into a desirable orientation with the first roller pair.

10. A shrimp processing apparatus comprising:

a roller pair rotatably operable for receiving a shrimp body between peripheral surfaces of each roller of the roller pair for conveying the shrimp body downstream therefrom;

a first cutting blade positioned for cutting into a dorsal side of the shrimp body being conveyed therepast, the first cutting blade including a spaced pair of saw tooth cutting discs rotatably carried in spaced relation for providing a strip within the shell of the shrimp body and thus access to a sand vein thereof; and a second cutting blade positioned for cutting through a ventral side of the shrimp body being conveyed therepast, wherein the first and second cutting blades are operable for severing the shell on the shrimp body into opposing left and right shell sections.

11. The apparatus according to claim 10, further comprising sweeping means positioned downstream the first cutting blade for sweeping the sand vein from the shrimp body being conveyed therepast.

12. The apparatus according to claim 10, further comprising at least one downstream roller pair rotatably operable downstream the first cutting blade for receiving a shrimp body between peripheral'surfaces of each roller of the roller pair and conveying the shrimp body further downstream therefrom.

13. The apparatus according to claim 10, wherein the first cutting blade further comprises a spacer carried between each of the spaced pair of saw tooth cutting discs for limiting a depth of cut into the shrimp body.

14. The apparatus according to claim 10, wherein the first cutting blade is movably biased toward the shrimp body for moving along a contour of the shrimp body during the cutting thereof.

15. The apparatus according to claim 10, wherein the roller pair includes first and second rollers each having a plurality of ribs radially extending from the peripheral surface thereof.

16. The apparatus according to claim 15, wherein the plurality of ribs include a plurality of ribs aligned generally parallel to an axis of rotation of the roller.

17. A method of processing shrimp comprising:

rotatably operating a first roller pair having spaced rollers for receiving a shrimp body between peripheral surfaces thereof and conveying the shrimp body downstream therefrom;

operating a first cutting blade having spaced cutters therein positioned for cutting a strip into a dorsal side of the shrimp body-being conveyed therepast thus providing access to a sand vein;

operating a second cutting blade positioned for cutting through a ventral side of the shrimp body being conveyed therepast, wherein the first and second cutting blades are operable for severing the shell on the shrimp body into opposing left and right shell sections;

sweeping the sand vein from the shrimp body being conveyed downstream the first cutting blade; and operating a second roller pair cooperating with the first roller pair for receiving the shrimp body therefrom and conveying same further downstream.

18. The method according to claim 17, wherein each of the first and second cutting blades comprises a saw tooth cutting disc having a knife styled edge, and wherein the cutting blade operating comprises rotatably driving same.

19. The method according to claim 17, further comprises limiting a depth of cut into the shrimp body.

20. The method according to claim 17, further comprising movably biasing the first cutting blade toward the shrimp body for moving the first cutting blade along a contour of the shrimp body during the cutting thereof.

21. The method according to claim 17, wherein the sweeping comprises rotatably driving a brush.

22. A method of processing a shrimp comprising:

operably rotating a roller pair positioned for receiving a shrimp body between peripheral surfaces thereof and conveying the shrimp body downstream therefrom;

positioning a first cutting blade for cutting into a dorsal side of the shrimp body being conveyed therepast, the first cutting blade including a spaced pair of saw tooth cutting discs rotatably carried in spaced relation for providing a strip within the shell of the shrimp body and thus access to a sand vein thereof; and positioning a second cutting blade for cutting through a ventral side of the shrimp body being conveyed therepast, wherein the first and second cutting blades are operable for severing the shell on the shrimp body into opposing left and right shell sections.

23. The method according to claim 22, further comprising sweeping the sand vein from the shrimp body.

24. The method according to claim 22, further comprising rotatably operating at least one downstream roller pair downstream the first cutting blade for receiving the shrimp body between peripheral surfaces thereof and conveying the shrimp body further downstream therefrom.

25. The method according to claim 22, further comprising movably biasing the first cutting blade toward the shrimp body for moving along a contour of the shrimp body during the cutting thereof.

* * * * *